United States Patent Office 2,925,435
Patented Feb. 16, 1960

2,925,435

PROCESS FOR PRODUCING MONOBROMACETIC ACID AND DERIVATIVES THEREOF

Arthur Schwerdle, Vineland, N.J.

No Drawing. Application May 16, 1957
Serial No. 659,468

16 Claims. (Cl. 260—487)

This invention relates to a process for preparing a mixture of bromacetic derivatives which may be converted to monobromacetic acid, esters and other derivatives thereof, and more particularly to a process for the preparation of such a mixture and the conversion thereof in high yield into substantially pure monobromacetic acid, esters and other derivatives thereof.

Monobromacetic acid is a well known article of commerce, and this acid and certain derivatives thereof are strong herbicides. Certain other derivatives of this acid are excellent fungicides and bactericides. It is well known that monobromacetic acid may be prepared by brominating acetic acid. However, very long reaction times, as for example reaction times of several days, are required to produce yields in the neighborhood of 70%. In order to shorten reaction time, the use of materials which act as catalysts have been suggested. Catalytic materials, such as sulfur, sulfur chloride, phosphorous and carbon disulfide, however, produce unwanted side reaction products which contaminate the monobromacetic acid and further purificaiton procedures, such as recrystallization, are required to produce a commercially acceptable product when these catalyst materials are employed. The use of other catalysts has also been suggested to decrease the time of reaction between bromine and acetic acid. Typical of these are pyridine and acetic anhydride which are employed in relatively small amounts. However, the use of such catalysts results in yields which generally do not exceed 85% of theoretical, and further purification of the product is generally required.

Since substitution is preceded by oxidative removal of hydrogen of acetic acid by bromine, bromine may be thought of as an oxidant. Since chlorine is a much more powerful oxidant than bromine, the analogous reaction between acetic acid and chlorine is more practical. Accordingly, it has also been suggested to manufacture monobromacetic acid from monochloracetic acid by means of aluminum bromide.

It is a principal object of this invention to provide a simple economical process readily adaptable to large scale commercial manufacture that produces a mixture of reaction products which may be converted, in high overall yield, to substantially pure monobromacetic acid and derivatives thereof.

Another object of this invention is the provision of a direct process for the preparation of monobromacetic acid of commercially acceptable purity without resort to further purification procedures.

A further object of this invention is to provide a process involving relatively simple process steps which provides a yield of monobromacetic acid in excess of 98% of theoretical.

Still another object of this invention is to provide a simple economical process for producing substantially pure organic esters and other derivatives of monobromacetic acid in high yields.

Other objects will become apparent from a consideration of this specification and claims.

According to this invention, there is provided a process for preparing a mixture of reaction products comprising monobromacetic acid and monobromacetyl bromide which may be converted in high yield to substantially pure monobromacetic acid and derivatives thereof which comprises brominating acetic anhydride at a temperature above about 70° C. with at least about two mols of bromine for each mole of acetic anhydride to form such mixture.

Preferably, the bromination of acetic anhydride is carried out by brominating the acetic anhydride with about two mols of bromine for each mole of acetic anhydride at a temperature of from about 80° to 105° C.

According to one embodiment of this invention the reaction products obtained by brominating acetic anhydride with bromine in the above-described manner are combined with sufficient water, to at least convert the monobromacetyl bromide in the reaction mixture to monobromacetic acid. Preferably at least about one mole of water is added for each mole of acetic anhydride originally employed.

In another embodiment of the invention, the mixture of reaction products obtained as above is reacted with sufficient alcohol, preferably about two mols of alcohol for each mole of acetic anhydride, to convert monobromacetic acid and monobromacetyl bromide to a monobromacetic acid ester of said alcohol. Other derivatives of monobromacetic acid, of course, may also be formed from the reaction mixture.

It was found that a substantially quantitative conversion of acetic anhydride to monobromacetic acid and monobromacetyl bromide can be accomplished by reacting at least about two mols of bromine with acetic anhydride at elevated temperatures above about 70° C. The bromination appears to take the course indicated by the following equations:

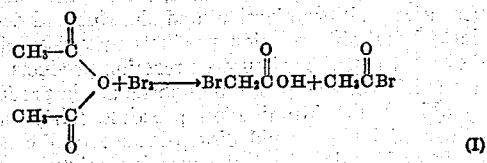

(I)

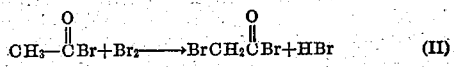

(II)

By carrying out the bromination of acetic anhydride according to this invention employing temperatures above about 70° C. and at least about two mols of bromine for each mole of acetic anhydride, the predominant reactions taking place appear to be those represented by Equations I and II, for an analysis of the reaction products has shown that they comprise essentially 98 percent or more of monobromacetic acid and monobromacetyl bromide. That the reaction should proceed in a substantially quantitative fashion is truely surprising in view of the prior teachings.

In addition, it was found that the crude mixture of reaction products comprising essentially monobromacetic acid and monobromacetyl bromide, may be converted to substantially pure monobromacetic acid by combining the mixture of reaction products with sufficient water to at least convert monobromacetyl bromide therein to monobromacetic acid. In view of the considerable efforts which have been made in order to provide a commercially feasible process for producing monobromacetic acid in high yield and of commercially acceptable purity, the finding that the process of this invention produces these desirable results is unexpected. For example, when the process of this invention is carried out according to a preferred form thereof wherein at least about one mole of water is added to the mixture of reaction products, yields of substantially pure monobromacetic acid in excess of about 98% are obtainable. Thus, the process of this invention provides a direct method for the preparation of monobromacetic acid which involves relatively simple and economical process steps.

Similarly, it was found that the crude reaction mixture resulting from bromination of acetic anhydride according to this method may be converted into substantially pure esters by treating the crude mixture with an organic alcohol under conditions suitable for esterification.

The yield and purity of monobromacetic acid or esters of monobromacetic acid will, of course, depend to a large degree on the purity of the reactants employed. Accordingly, acetic anhydride which contains little or no acetic acid, as for example less than 5% acetic acid, is preferably employed.

As stated above, at least about two mols of bromine for each mole of acetic anhydride are employed in effecting the bromination. Of course, the use of a substantial excess of bromine should be avoided, since the employment of such an excess of bromine is unnecessary in forming the mixture of reaction products provided by the process of this invention and the presence of such excess bromine presents a purification problem in obtaining a product of high purity. Preferably about two mols of bromine are used for each mole of acetic anhydride.

Bromination is carried out at generally elevated temperatures above 70° C. It was found that if temperatures substantially below 70° C. are employed, a mixture of reaction products results, which does not allow of conversion to substantially pure monobromacetic acid and its esters. Rather, yields of the desired monobromacetic products are relatively poor and the product, which is of low purity, must be further purified, as for example by recrystallization. Generally, the bromination may be carried out successfully at temperatures of from about 70° to about 135° C., and preferably at temperatures from about 80° to about 105° C. The employment of temperatures substantially in excess of about 135° C. should generally be avoided, for at such higher temperatures multibromination, and charring and decomposition of desirable reaction products may take place with the result that the mixture of reaction products produces poor yields of low purity monobromacetic product.

Initially, the bromination proceeds fairly rapidly as evidenced by the rapid disappearance of the distinctive color of bromine from the reaction mixture. It is believed that the reaction proceeds with cleavage of acetic anhydride resulting in the formation of bromacetic acid and acetyl bromide. After formation of a substantial quantity of acetyl bromide has taken place, the course of the reaction increasingly becomes one of bromination of acetyl bromide to bromacetyl bromide with the evolution of hydrogen bromide. The bromination of acetyl bromide to bromacetyl bromide takes place at a rate slower than the reaction by which bromacetic acid and acetyl bromide are formed. Preferably, the bromination is conducted by refluxing back from evolved hydrogen bromide, acetyl bromide, which boils at about 75°C., and other reaction products. Also, bromine is preferably added to acetic anhydride at such a rate that at no time during the course of the reaction large quantities of bromine are permitted to accumulate in the reaction zone.

In the formation of a reaction product comprising monobromacetic acid, sufficient water is added to the mixture of reaction products so formed to at least convert the monobromacetyl bromide therein to monobromacetic acid. The amount of water required may be determined generally by observing when evolution of hydrogen bromide ceases for hydrogen bromide is a by-product of this reaction. Generally, at least about one mole of water should be added for each mol of acetic anhydride originally employed. Of course, further additions of water can be made if it is desirable to provide aqueous solutions of monobromacetic acid. During addition of the water, the resulting mixture is preferably heated to an elevated temperature of from about 85° to the boiling point of the solution. After the addition of water is completed, the monobromacetic acid having a small amount of hydrogen bromide dissolved therein is preferably heated to a temperature on the order of about 130° to about 150° C. in order to remove dissolved hydrogen bromide.

The monobromacetic acid so produced will be substantially pure, i.e. it will generally comprise 98% or more of monobromacetic acid. Thus, the product has a degree of purity making it commercially acceptable without resorting to further purification procedures which are generally costly. Neither is there any undesirable waste of reactants as in the formation of substantial quantities of unwanted by-products.

High yields of substantially pure esters of monobromacetic acid may be prepared by treating the crude mixture of products of reaction under suitable conditions for esterification. For example, lower aliphatic esters, such as methyl, ethyl, and isopropyl esters, and higher molecular weight aliphatic esters, such as the cetyl ester, of monobromacetic acid may be prepared by treating the crude mixture with the correspondnig aliphatic monohydroxy alcohol, e.g. isopropyl alcohol and cetyl alcohol, under suitable conditions for esterification. Polyhydroxy alcohol esters may also be so prepared by esterification with the corresponding alcohol such as ethylene and propylene glycol, pentaerythritol, and the like. Similarly, aryl alkyl esters may also be prepared from aryl alkanols such as benzyl alcohol and the like.

In the esterification of the reaction mixture comprising essentially bromacetic acid and bromacetyl bromide it is believed that the reaction proceeds with initial esterification of bromacetyl bromide and the evolution of hydrogen bromide, followed by reaction between the bromacetic acid present and the alcohol with the formation of water as a by-product. Since hydrogen bromide is evolved during the course of the esterification, suitable alcohols for esterification are those which do not react with hydrogen bromide, as for example alcohols such as those mentioned above.

Although the esterification of bromacetyl bromide proceeds at ambient temperatures, the entire esterification reaction proceeds in a more controlled fashion at slightly elevated temperatures on the order of from about 50° to 110° C. Preferred temperatures for esterification of the reaction mixture are in the range between about 80° and 110° C.

Preferably, the esterification is carried out employing an inert organic diluent, suh as ethylene dichloride, benzene, xylene, and the like, which serves to remove by-product water by forming a binary mixture therewith which boils at a temperature below the boiling point of any of the individual components present and within the esterification temperature range. The water may be removed from the binary mixture after condensation thereof, and the organic diluent returned to the mixture. Continuous removal of by-product water, without loss of organic diluent, can thus be effected, thereby assisting in forcing the esterification reaction to completion.

Chemical catalysts which do not interfere with the bromination or produce unwanted side reaction products may be employed during bromination. The preferred catalyst is pyridine.

This invention will be more readily understood from a consideration of the following examples; however, there is no intention to be limited thereto except as defined in the appended claims.

*Example I*

102 g. (1 g. mole) of acetic anhydride is placed in a flask fitted with a thermometer, reflux condenser and entrainment tower, and the flask is heated to about 85° C. 160 g. (1 g. mole) of bromine is added to the acetic anhydride while under reflux as rapidly as it will react, as evidenced by the disappearance of the color of bromine, while the temperature is maintained at about 85° C. No evolution of hydrogen bromide is observed.

Thereafter, another 160 g. (1 g. mole) of bromine is added to the contents of the flask somewhat more slowly than the previous addition of bromine while the flask is maintained at a temperature of 85° C. Hydrogen bromide is evolved and permitted to escape from the flask to the entrainment tower for absorption while monobromacetyl bromide and monobromacetic acid are entrained and returned to the flask.

An analysis of the products of reaction by fractional distillation methods is as follows:

| | Percent |
|---|---|
| Monobromacetic acid | 49 |
| Monobromacetyl bromide | 49 |
| Compounds of undetermined composition (fore-run and distillate residue) | 2 |

*Example II*

18 g. (1 g. mole) of water is added to the mixture of reaction products of Example I, and the temperature of the flask is maintained about 85° C. A copious evolution of hydrogen bromide is observed. The flask is then heated at 150° C. for about one half hour to remove dissolved hydrogen bromide. An analysis of the product reveals a yield of monobromacetic acid in excess of 98% of theoretical.

*Example III*

426 g. of a reaction mixture obtained by the method of Example I is dissolved in benzene. 62 g. of ethylene glycol is added to the reaction mixture and there is a strong evolution of hydrogen bromide. When no further evolution of hydrogen bromide is observed, the reaction mixture is heated under reflux in such a manner that water generated is trapped and does not return to the reaction mixture. When no further water is generated, the reaction mixture is fractionally distilled and a yield of about 95% of ethylene glycol bromacetate is obtained.

*Example IV*

242 g. (1 g. mole) of cetyl alcohol is reacted with 331 g. of a reaction mixture produced according to Example I in the manner set forth in Example III, producing cetyl bromacetate.

*Example V*

136 g. (1 g. mole) of pentaerythritol is reacted with 331 g. of a reaction mixture produced according to Example I in the manner set forth in Example III, producing pentaerythritol bromacetate.

Although the invention has been described with reference to certain preferred specific embodiments thereof, it is not to be limited thereto except as defined in the claims appended hereto.

I claim:
1. A process which comprises brominating acetic anhydride containing less than 5% acetic acid at a temperature of from about 70° C. to about 135° C. with at least about 2 mols of bromine for each mol of acetic anhydride to form a mixture of reaction products comprising monobromacetic acid and monobromacetyl bromide.

2. The process of claim 1 wherein bromination is carried out at a temperature of from about 80° to about 105° C.

3. A process which comprises preparing a mixture of reaction products comprising monobromacetic acid and monobromacetyl bromide by the method which includes brominating acetic anhydride containing less than 5% acetic acid at a temperature of from about 70° C. to about 135° C. with at least about two mols of bromine for each mol of acetic anhydride; and combining the mixture with sufficient water to at least convert monobromacetyl bromide in said mixture to monobromacetic acid, and recovering substantially pure monobromacetic acid.

4. The process of claim 3 wherein bromination is carried out at a temperature of from about 80° to about 105° C.

5. The process of claim 3 wherein at least about one mole of water is combined with the reaction products for each mole of acetic anhydride employed.

6. The process of claim 5 wherein the resulting bromacetic acid is heated to an elevated temperature of from about 130° to about 150° C. to effect removal of hydrogen bromide.

7. In a process for the preparation of a monobromacetic acid ester of an alcohol by reacting a mixture of monobromacetic acid and monobromacetyl bromide with at least sufficient alcohol to convert said monobromacetic acid and monobromacetyl bromide to a monobromacetic acid ester of said alcohol, the step which comprises preparing said mixture of monobromacetic acid and monobromacetyl bromide by the method which includes brominating acetic anhydride containing less than 5% acetic acid at a temperature from about 70° C. to about 135° C. with at least about two mols of bromine for each mol of acetic anhydride.

8. The process of claim 7 wherein said alcohol is an aliphatic monohydroxy alcohol.

9. The process of claim 7 wherein said aliphatic alcohol is cetyl alcohol.

10. The process of claim 7 wherein said alcohol is a polyhydroxy aliphatic alcohol.

11. The process of claim 10 wherein said polyhydroxy aliphatic alcohol is pentaerythritol.

12. The process of claim 7 wherein bromination is carried out at a temperature of from about 80° to about 105° C.

13. A process which comprises preparing a mixture of reaction products comprising monobromacetic acid and monobromacetyl bromide by the method which includes brominating acetic anhydride containing less than 5% acetic acid at a temperature of from about 80° to about 105° C. with about two mols of bromine for each mole of acetic anhydride; and heating the mixture to an elevated temperature of from about 85° C. to about the boiling point of said mixture with at least about 1 mole of water for each mole of acetic anhydride to convert monobromacetyl bromide therein to monobromacetic acid with the evolution of hydrogen bromide, further heating the mixture to a temperature of from about 130° to 150° C. to remove dissolved hydrogen bromide, and recovering substantially pure monobromacetic acid.

14. In a process for making a bromacetic acid ester of an alcohol by heating a mixture of reaction products comprising monobromacetic acid and monobromacetyl bromide with about two mols of an aliphatic alcohol to a temperature of from about 50° C. to about 110° C. in the presence of an inert organic diluent to form the monobromacetic acid ester of said alcohol, the step which comprises preparing said mixture of reaction products comprising monobromacetic acid and monobromacetyl bromide by the method which includes brominating acetic anhydride containing less than 5% acetic acid at a temperature from about 80° to about 105° C. with about two mols of bromine for each mol of acetic anhydride.

15. The process of claim 14 wherein said alcohol is cetyl alcohol.

16. The process of claim 14 wherein said alcohol is pentaerythritol.

References Cited in the file of this patent

UNITED STATES PATENTS 2,539,238    Charles M. Eaker    Jan. 23, 1951